United States Patent [19]
Dominguez et al.

[11] Patent Number: 5,254,668
[45] Date of Patent: Oct. 19, 1993

[54] POLYAMIDOPOLYFUNCTIONAL AMINE FROM LACTAM AND ETHER AMINE

[75] Inventors: Richard J. G. Dominguez; Richard J. Clark, II; Richele T. Howelton; George P. Speranza, all of Austin, Tex.

[73] Assignee: Texaco Chemical Company, White Plains, N.Y.

[21] Appl. No.: 905,699

[22] Filed: Jun. 29, 1992

[51] Int. Cl.$^5$ .............................................. C08G 69/14
[52] U.S. Cl. ..................................... 528/323; 525/420; 525/424; 528/313; 528/315; 528/317; 564/152; 564/153; 564/158; 564/159; 564/193; 564/201
[58] Field of Search ............... 528/323, 315, 317, 313; 564/152, 153, 158, 159, 193, 201; 525/420, 424

[56] References Cited

U.S. PATENT DOCUMENTS

| | | | |
|---|---|---|---|
| 2,264,293 | 12/1941 | Brubaker | 528/315 |
| 2,359,867 | 10/1944 | Martin | 260/78 |
| 2,526,078 | 10/1950 | Kropa et al. | 528/323 |
| 3,454,534 | 7/1969 | Crovatt, Jr. | 260/78 |
| 3,555,114 | 1/1971 | Reimschuessel et al. | 528/323 |
| 3,972,961 | 8/1976 | Hammer et al. | 260/857 G |
| 4,017,557 | 4/1977 | Hammer et al. | 260/857 G |
| 4,044,071 | 8/1977 | Nickol | 260/857 TW |
| 4,045,511 | 8/1977 | Nickol | 260/857 TW |
| 4,113,794 | 9/1978 | Thompson et al. | 260/857 TW |
| 4,130,602 | 12/1978 | Thompson | 260/857 TW |
| 4,136,133 | 1/1979 | Thompson | 260/857 TW |
| 4,297,454 | 10/1981 | Thompson | 525/432 |
| 4,919,997 | 4/1990 | Twilley et al. | 428/227 |

FOREIGN PATENT DOCUMENTS 0163902 12/1985 European Pat. Off. .
0324432 7/1989 European Pat. Off. .

OTHER PUBLICATIONS

T. G. Majury, "Amines and Carboxylic Acids as Initiators of Polymerization in Caprolactam," *Journal of Polymer Science*, vol. 31, 1958, pp. 383–397.
G. M. Burnett, et al., "Polymerization of Caprolactam. I. Initiation by Amines," *SCI Monograph No. 20: The Chemistry of Polymerization Processes*, 1966, pp. 139–156.
S. W. Shalaby, et al., "Nylon 12—Poly(oxybutylene)-Block Copolymers," *Ind. Eng. Chem. Prod. Res. Develop.*, vol. 12, No. 2, 1973, pp. 128–132.
S. W. Shalaby, et al., "Copolymerization of Caprolactam with Polyoxybutylene Diamine," *Polymer Engineering and Science*, Mar., 1973, vol. 13, No. 2, pp. 88–95.
R. A. Lofquist, et al., "Hydrophilic Nylon for Improved Apparel Comfort," *Textile Research Journal*, Jun. 1985, pp. 325–333.
L. Z. Chung, et al., "Block Copolyetheramides. II. Synthesis and Morphology of Nylon-6 Based Block Copolyetheramides," *J. Polym. Sci. Part A: Polym. Chem.*, vol. 30, 1992, pp. 951–953.

*Primary Examiner*—Harold D. Anderson
*Attorney, Agent, or Firm*—James L. Bailey; Kenneth R. Priem; David L. Mossman

[57] ABSTRACT

Amidamines of the following formula are described:

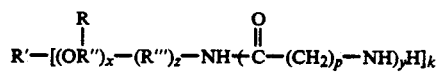

where
R is independently hydrogen or lower alkyl of 1 to 4 carbon atoms;
R' is an alkyl group if k is 1, or an alkylene group if k is greater than 1; where R' has 2 to 18 carbon atoms;
R'' is independently lower alkylene of 2 to 4 carbon atoms;
R''' is independently straight or branched lower alkylene of 2 to 6 carbon atoms;
x is independently 1 to 200;
y is independently 1 to 300;
z is independently 1 to 200;
p is independently 2 to 11; and
k is from 1 to 8; where the x and z groups may be distributed in blocks or randomly.

These compositions are made by reacting a cyclic lactam with an etheramine. Incorporation of increasing quantities of the polyetherpolyamine did not decrease the crystalline melting point ($T_m$) of the resulting copolymer. The polyamidopolyfunctional amines (poly(amide-ether-amide) triblock copolymers) have a relatively low modulus and retain higher use temperatures than current polyetheramide segment block copolymers. The polyamidopolyether amines may be further interconnected through reaction with dicarboxylic acids, esters and the like.

14 Claims, 3 Drawing Sheets

POLYAMIDOPOLYFUNCTIONAL AMINE FROM LACTAM AND ETHER AMINE

FIELD OF THE INVENTION

The invention relates to polyamide copolymers, and more particularly relates, in one aspect of the invention, to amide copolymers containing ether linkages which polymers have a lower modulus and higher use temperature than conventional polyetheramide segment block copolymers.

BACKGROUND OF THE INVENTION

Synthetic thermoplastic high molecular weight polyamides are made by the condensation of aminocarboxylic acids or by heating diamines with dibasic acids, as is well known and shown by U.S. Pat. Nos. 2,071,250; 2,071,253 and 2,130,948. These end products have been used to prepare fibers, films, bristles, felts, adhesives, molded engineering objects, etc.

It is well known that polyamides such as nylon-5, nylon-6, nylon-8, and nylon-12 have been produced by ring-opening polymerization of appropriate lactams. Nylon-6, also called polycaprolactam, was originated by I. G. Farbenindustrie in 1940. In one preparation technique, the polymerization of $\epsilon$-caprolactam (also known as $\epsilon$-aminocaprolactam or simply caprolactam), is carried out by adding water to open the ring and then removing water again at elevated temperature, where linear polymer forms. Caprolactam may also be polymerized by ionic chain mechanisms.

Nylon-6 has properties similar to nylon-66, but has a lower crystalline melting point and is somewhat softer and less stiff. The major use for the polymer is in tire cord. Polycaprolactam accounts for about 25% of U.S. consumption of nylon.

Attempts are constantly being sought for the improvement of these polymers. For example, a few years after the invention of nylon 6,6 made from hexamethylene diamine and adipic acid, it was discovered that substitution of a portion of hexamethylene diamine with triethyleneglycol diamine gave polyamides with better dye receptivity and enhanced water absorption, as shown in U.S. Pat. Nos. 2,359,867 and British Patent 562,370. An excellent example of how comfort and feel can be added to nylon 6 type polyamides has been described by R. A. Lofquist, et al., "Hydrophilic Nylon for Improved Apparel Comfort," *Textile Research Journal*, June 1985, p. 325-333. These authors copolymerized caprolactam with polyethyleneoxy diamines and dibasic acids such as terephthalic acid. Comfort-related tests revealed that fabrics made from such fibers are superior to those from polyesters and polyamides. See also U.S. Pat. No. 4,919,997 for a description of water-absorbing mats made using these techniques. The meltblown water-absorbing mat of fibers of this patent comprise a block copolyetheramide having polyether and polyamide segments. The JEFFAMINE ® ED-Series amines were used as the amine-terminated polyethylene oxide glycols by Lofquist, et al. to produce a modified nylon-6. These amines are high molecular weight (600 to 2000) alkylene glycol diamines having the formula $H_2NRNH_2$, where the radical R is a polyoxyalkylene chain of molecular weight of from about 200 to about 4000 having terminal carbon atoms to which nitrogen atoms are bonded. Moisture absorption was found to be greatest using the amines having the highest molecular weight.

Also of interest is S. W. Shalaby, et al., "Copolymerization of Caprolactam with Polyoxybutylene Diamine," *Polymer Engineering and Science*, March, 1973, Vol. 13, No. 2, pp. 88-95. This article describes that nylon 6-polyoxybutylene block copolymers were prepared by reacting polyoxybutylene diamine with caprolactam in the presence of phosphoric acid. The copolymerization was carried out in a Helicone-type reactor and the effect of time, temperature and caprolactam concentration on the properties of the products was recorded. Differential Scanning Calorimetry (DSC) studies of the products suggested the presence of both the ABA and AB types of sequences, where A and B represent nylon 6 and polyether blocks, respectively. Dynamic mechanical measurements of typical copolymers revealed the presence of at least two different nylon moieties. The melt rheology data reflected a general increase in the pseudoplasticity of the copolymer with the increase of the polyether content. Increases of the polyether content in the copolymer resulted in an increased elongation and a decreased tensile strength and modulus.

Similarly, the copolymerization of laurolactam with poly(oxybutylene)diamine was achieved by the same authors by allowing the reactants to react in the presence of phosphoric acid at 220°-275° for 3-24 hours, as reported in S. W. Shalaby, et al., "Nylon 12—Poly(oxybutylene) Block Copolymers," *Ind. Eng. Chem. Prod. Res. Develop.*, Vol. 12, No. 2, 1973, pp. 128-132. The effect of reaction conditions on the conversion and the composition of the copolymers was measured. The structure of the copolymers was determined by conventional methods, including infrared, X-ray and DSC techniques. The DSC data suggested the presence of both the ABA and AB types of sequences, where A and B represent nylon 12 and poly(oxybutylene) blocks, respectively. The copolymers were shown to have higher elongation and lower modulus than nylon 12 and became more flexible and ductile as the weight fraction of the poly(oxybutylene) block increased.

Modified nylon 6 polymers may be prepared with improved mechanical properties by polymerizing $\omega$-lactams with a polyisocyanate blocked with $\omega$-lactam, a polyoxyethylene diamine and an alkali lactamate, as a catalyst salt, as described in European Patent Application 0324432.

See also European Patent 0 163 902 A1 which relates to high polymerization degree polyetheresteramides having no gelated materials and superior color tones. These polyamides are apparently quickly obtained through the polycondensation reaction carried out between (a) one or more than two polyamide forming components selected from lactams and aminocarboxylic acids as well as the salts of substantially equal quantities of diamines and dicarboxylic acid, and (b) the polyetherester forming components consisting of substantially equal quantities of dicarboxylic acids and poly(alkylene oxide) glycols, in the presence of 0.001 to 0.5 percent by weight of the mixtures composed of antimony oxides-/organic tin compounds, and more preferably, in the co-presence of 0.0005 to 0.5 percent by weight of phosphoric compounds.

U.S. Pat. No. 3,454,534 indicates that the hydrophilic characteristics of nylon-66 may be improved by adding a polyalkylene glycol diamine to the molten polymer prior to spinning. The process involves producing polyhexamethylene adipamide where equimolar proportions of adipic acid and hexamethylene diamine are reacted together to form molten polyhexamethylene adipamide. The improvement involved introducing from about 0.3 to 3.0 weight percent of a polyalkylene glycol diamine into the molten polymer subsequent to polymer formation and prior to spinning. The polyalkylene glycol diamine has the formula: $H_2N-(CH_2)_3-O-[R-O]_x-(CH_2)_3-NH_2$ where R is an alkylene hydrocarbon radical having a chain length of from 2 to about 8 carbon atoms, and x is an integer sufficiently large to confer a molecular weight of at least 1000. Note that propylene linkages are required and that the polyalkylene glycol diamine must have a molecular weight of at least 1000.

Block copolymers of poly(oxa-amide) and polyamide are described in U.S. Pat. Nos. 4,113,794; 4,130,602 and 4,136,133. The '794 patent discusses novel copolymers formed by melt blending a melt spinnable polyamide, such as nylon-6, and a block of random poly(dioxa-amide), such as a copolymer prepared from the mixture of caprolactam and the salt of adipic acid and 4,7-dioxadecamethylene diamine. Block copolymers formed by melt blending a melt spinnable polyamide such as nylon-6 and a poly(dioxa-amide) such as poly(4,7-dioxadecamethylene adipamide) is disclosed in the '602 patent. The '133 patent teaches block copolymers formed by melt blending a melt spinnable polyamide such as nylon-6 and a poly(oxa-amide) such as poly(4-oxaheptamethylene adipamide). As examples only, in the '133 patent, the poly(oxa-amide) groups have the formula:

where $R_1$, $R_2$ and $R_3$ are hydrogen, $C_1-C_{10}$ alkyls and $C_3-C_{10}$ isoalkyls; $R_4$ is selected from the group consisting of $C_0-C_{10}$ alkylenes and $C_3-C_{10}$ isoalkylenes, where y may range from 4 to 200. All of these materials are noted to have utility as fibers.

U.S. Pat. Nos. 4,044,071 and 4,045,511 describe methods for making the copolymers discussed in the previous paragraph. The '071 patent teaches a process for forming block copolymers by mixing a dry salt of a prepolyamide and a molten melt-spinnable polyamide. The mixture is heated to a temperature in the range of between the melting point of the higher melting component of the mixture to below the amide-interchange temperature of a blend of the melt-spinnable polyamide and the homopolymer which would result from the polymerization of the salt. Mixing and heating is continued until substantially all of the salt and the polyamide are converted into a block copolymer. The '511 patent teaches a similar process, but one that is lower in energy and uses a blend of dry particles of a melt-spinnable polyamide, rather than using the polyamide in the molten state.

U.S. Pat. No. 4,297,454 teaches a method for preparing a block copolymer of an ether-free polylactam and a polyetheramide, e.g., poly(4,7-dioxadecamethylene adipamide) involving polymerizing a lactam, e.g., caprolactam, in contact with the polyetheramide. At least one of the lactams and the polyetheramide are molten during the lactam polymerization and block copolymer formation. The materials prepared appear similar to those described in U.S. Pat. Nos. '794; '602 and '133, described above. Examples of polyetheramides mentioned in the '454 patent include poly(4,7-dioxadecamethylene adipamide), poly(4,7-dioxadecamethylene sebacamide), poly(4,9-dioxadodecamethylene adipamide), poly(4,8-dioxa-6,6-dimethylundecamethylene adipamide), poly(4,7-dioxa-2,9-dimethyldodecamethylene adipamide), poly(4,7-dioxadecamethylene-2-methyladipamide), poly(4-oxaheptamethylene adipamide), and poly(4-oxa-2,6-dimethylmonomethylene adipamide).

Two patents, U.S. Pat. Nos. 3,972,961 and 4,017,557 relate to graft copolymers where the side chain polymers to be added to the trunk copolymers come from reactions of caprolactam with compounds having a single reactive amine site. The '961 patent describes these side chain polymers as:

where $R_1$ is hydrogen or $C_1$ to $C_{18}$ alkyl; $R_2$ is $C_1$ to $C_{18}$ alkyl, aralkyl, e.g. benzyl; aryl, e.g., phenyl; or $R_1$ and $R_2$ taken together constitute a 5 or 6-membered ring; r and p are integers; r is preferably 3-11 and p is preferably 4-29. The '557 side chain polymer structure is more complex.

The '961 patent describes a process for the preparation of thermoplastic graft copolymers which comprises heating for about 15 seconds to 60 minutes, with mixing, a trunk copolymer of at least two monomers, at least one of said monomers providing amine-reactive sites taken from the group consisting of the anhydride group, e.g., maleic anhydride; a vicinal pair of carboxylic groups and a carboxylic acid adjacent to an alkoxycarbonyl group, wherein the alkoxy group contains up to 20 carbon atoms, and at least one of said monomers containing no amine-reactive sites, and at least one side chain polymer having per chain one active amine site taken from the group consisting of primary and secondary amines, the remainder of said side chain polymer being substantially unreactive with the reactive sites, e.g., amino-substituted polycaprolactam, polylaurolactam, polyethylene oxide, etc., of the trunk copolymer. The process provides control of the type and length of the side chain polymer grafted onto the trunk copolymer. Plastic graft copolymers are included, specifically those containing one or more side chain polymer types with the proviso that when only one type of side chain polymer is present the side chain polymer contains only one nitrogen atom, said atom being found in the active amine site.

The U.S. Pat. No. 4,017,557 teaches 6-nylons and 12-nylons having primary amino end-groups and an average degree of polymerization of about 5-60 may be grafted onto elastomeric trunk polymers having anhydride groups, vicinal carboxylic groups, or carboxylic groups adjacent to alkoxycarbonyl groups by heating a mixture of the nylon and the trunk polymer, preferably under high shear conditions for about 1 minute or less to 30 minutes or more above the melting temperature of the nylon. The resulting elastomeric graft polymers are suitable for fabricating into a variety of articles, such as, for example, wire jacketing, hose, belts, seals, gaskets, and low pressure tires.

L. Z. Chung, et al., "Block Copolyetheramides. II. Synthesis and Morphology of Nylon-6 Based Block Copolyetheramides," *J. Polym. Sci. Part A: Polym. Chem.*, Vol. 30, 1992, pp. 951-953 describes a novel preparation method of nylon-6 based block copolyetheramides. The new approach avoids phase separation by an alternate route. Poly(tetramethylene) glycols (PTMEGs) were reacted with caprolactam in the presence of adipic acid.

U.S. Pat. No. 5,030,710 notes that novel modified nylon-6 may be produced by using a combination of one or more dicarboxylic acids and triethylene glycol diamine and tetraethylene glycol diamine. A dicarboxylic acid/polyethylene glycol diamine salt may be reacted with ε-caprolactam to provide the modified nylon-6. The diamines have the formula $NH_2-(CH_2CH_2O)_x-CH_2CH_2-NH_2$, where x ranges from 2 to 3. Surprisingly, the suitable diamines include triethylene glycol diamine (x=2; JEFFAMINE® EDR-148 Amine) and tetraethylene glycol diamine (x=3; JEFFAMINE® EDR-192 Amine), but not closely related bis-aminoethyl ether (x=1; BAEE). Unexpectedly, BAEE, which only differs from JEFFAMINE EDR-148 Amine by one $-(CH_2CH_2O)-$ group, did not give satisfactory product — the fibers were too weak. The resulting modified nylon-6 polymers of the invention, however, including fibers therefrom, have improved water absorbancy properties and greater flexibility. Polyamide products with a wide range of water adsorbancies may be obtained by adjusting the amount of amide.

Finally, it is known to use monoamines and diamines to effect the polymerization of caprolactam. These amines do not contain ether groups and are taught as initiators and not as reactive modifiers. See, for example, T. G. Majury, "Amines and Carboxylic Acids as Initiators of Polymerization in Caprolactam," *Journal of Polymer Science*, Vol. 31, 1958, pp. 383-397, where this phenomenon is studied using benzylamine and hexamethylenediamine. There is also G. M. Burnett, et al., "Polymerization of Caprolactam. I. Initiation by Amines," *SCI Monograph No. 20: The Chemistry of Polymerization Processes*, 1966, pp. 139-156, which discusses the study of the polymerization of ε-caprolactam by dilatometry in the temperature range 200°-230° using a variety of organic amines and amine hydrochlorides as initiators.

Although nylon-6 has been incrementally improved as shown by the publications discussed above as examples, there remains a need for new polyamides having a lower modulus, but which retain the beneficial properties of the original polyamide materials, in this case, nylon-6. In particular, it is desirable to retain the higher use temperatures as compared with currently available polyether amide segment block copolymers.

SUMMARY OF THE INVENTION

Accordingly, it is an object of the present invention to provide amidoamines having lower modulus, but with essentially the same crystalline melting point as compared with those polyamines without the ether segment.

It is another object of the present invention to provide an amidoamine which retains a higher use temperature as compared with currently available polyetheramide segmented block copolymers.

Another object of the invention is to provide amidoamines which may be readily made.

In carrying out these and other objects of the invention, there is provided, in one form, an amidoamine of the formula:

where
R is independently hydrogen or lower alkyl of 1 to 4 carbon atoms;
R' is an alkyl group if k is 1, or an alkylene group if k is greater than 1; where R' has 2 to 18 carbon atoms;
R" is independently lower alkylene of 1 to 4 carbon atoms;
R''' is independently straight or branched lower alkylene of 2 to 6 carbon atoms;
x is independently 1 to 200;
y is independently 1 to 300;
z is independently 1 to 200;
p is independently 2 to 11; and
k is from 1 to 8; where the x and z groups may be distributed in blocks or randomly.

DETAILED DESCRIPTION OF THE INVENTION

It has been discovered that amidoamines with useful and unusual properties may be made by reacting an amine having polyether groups with cyclic lactams. For example, the amidoamines retain their crystalline melting point, but have lower modulus as compared with prior polyamines which have ether groups inserted. It is anticipated that these materials may be further reacted with a dicarboxylic acid or a diisocyanate to obtain a thermoset polymer. This further polymerization cannot be accomplished with material made from monofunctional amines, as contrasted with the polyfunctional amines used in this invention.

Our invention differs from those of the art due to its simplicity and the novel products made along with the wide range that may be produced. The equation below illustrates one aspect of the reaction of this invention using a trifunctional amine.

caprolactam    trifunctional polyetheramine polyamidopolyether amine where the sum of all the y moieties is approximately 90% of the molar amount of caprolactam, since only about 90% of the caprolactam adds to the polyamine. R is defined as hydrogen or lower alkyl of 1 to 4 carbon atoms; R' is alkylene of 2 to 8 carbon atoms and all x moieties are independently 1 to 200.

In our work we get no crosslinking when tri-, tetra-, and pentafunctional amines are allowed to react with cyclic lactams. Primary amines over a wide molecular weight range can be made, that is, amines may have just a few moles to a thousand moles of caprolactam attached. Thus liquid products or high molecular weight engineering plastics may be made by this technique.

In one embodiment of this invention, the amidoamines have the formula:

$$R'-[(OR'')_x-(R''')_z-NH-\overset{O}{\underset{}{C}}-(CH_2)_p-NH)_yH]_k$$

where R is independently hydrogen or lower alkyl of 1 to 4 carbon atoms; R' is an alkylene group of 2 to 18 carbon atoms; R" is independently lower alkylene of 2 to 4 carbon atoms, thereby encompassing ethylene oxide, propylene oxide and butylene oxide moieties in random or block groups; R''' is independently straight or branched lower alkylene of 2 to 6 carbon atoms, thereby encompassing ethylene, propylene, butylene, etc. moieties in random or block groups; y is independently 1 to 300; p is independently 2 to 11; x is independently 1 to 200; y is independently 1 to 300; z is independently 1 to 200; and k is from 1 to 8. The x and z groups may be distributed in blocks or randomly, and are understood not to necessarily appear in the order depicted when both are presented, that is, either the alkoxy x or the alkylene z groups may be closest to the amide groups. In another embodiment of this invention R' is an alkylene group of 2 to 10 carbon atoms; y is independently 1 to 150; p is independently 5 to 11; x is independently 1 to 120; z is independently 1 to 120; and k is from 1 to 5. Preferably, R' is an alkylene group of 2 to 6 carbon atoms; y is independently 1 to 125; p is independently 5 to 11; x is independently 1 to 100; z is independently 1 to 100; and k is from 1 to 3. In one embodiment of the invention, x is at least 1; in another embodiment, z is at least 1. In still another embodiment of the invention, k is 1, or k is 2, or k is at least 3.

The cyclic lactams suitable for use in this invention include, but are not limited to caprolactam, laurolactam, etc. They may have the structure of the formula:

where p ranges from 2 to about 11, preferably from about 5 to about 11. More than one cyclic lactam may be used, if desired. The etheramine may have the structure:

where x is independently 1 to 200, z is independently 1 to 200, preferably from about 15 to about 150; k is from 1 to 8, preferably from 1 to 4; R is independently hydrogen or lower alkyl of 1 to 4 carbon atoms; R' is an alkylene group of from 2 to about 18 carbon atoms having sufficient positions to accommodate the k polyetheramine arms; R" is independently lower alkylene of 2 to 4 carbon atoms and R''' is independently straight or branched lower alkylene groups of 2 to 6 carbon atoms. The x groups may be random or block groups of ethylene oxide, propylene oxide and butylene oxide moieties. The z groups may be random or block groups of ethylene, propylene, butylene moieties and the like. The alkoxy x groups and the alkylene z groups may be mixed randomly or in blocks, and it will be understood that regardless of the formula immediately depicted above, it is immaterial which of x or z is closest to the primary amine group; both possibilities are encompassed herein. These etheramines be made by alkoxylating and then aminating a suitable polyol initiator. As will be described, suitable polyetherpolyamines are the appropriate members of the JEFFAMINE® amine products made by Texaco Chemical Company.

As noted previously, the mole ratio of cyclic lactam to polyamine may range from a few to very many. A temperature range suitable for the reaction to prepare the polyamidopolyether amines is from about 220° to about 300° C., and the pressure may range from about 0 to about 600 psig. More preferably, the temperature ranges from about 240° to about 260° C., and the pressure may range from about 0 to about 400 psig. A heterogeneous or homogeneous acid catalyst may be employed. Suitable catalysts include, but are not necessarily limited to hypophosphorous acid, phosphoric acid, and phenyl phosphoric acid.

Although the process to make the materials of this invention may be practiced without any water, in some embodiments of the invention it is preferred that some water is used to aid in opening the caprolactam and increasing the speed of the reaction. The amount of water influences the product distribution as well. As little as 1% water, based on the total amounts of the reactants, may be employed. In general, the more water used, the lower the molecular weight.

The invention will be demonstrated further in the following experimental Examples, which are merely meant to illuminate the invention and not to limit it in any way. The poly (amide-ether-amide) triblock copolymers (polyamidopolyfunctional amines) were prepared using the following procedures.

EXAMPLE 1

Example 1 illustrates a typical run: caprolactam 720 g, IRGANOX 1098 1.8 g, JEFFAMINE T3000 80 g, and 4 drops of hypophosphorous acid in 300 g of deionized water were added to a two liter, stirred, stainless steel batch reactor. The reactor has two inert gas inlets (top and bottom) and an outlet on the top that can be connected to vacuum or a collection flask. The reactor was purged with purified nitrogen, sealed and heated to 260° C. The reactor was held at 260° C. for 60 minutes. The pressure generated during the heating process was vented off. The reactor was held at 260° C. for three hours under a blanket of purified nitrogen. The polymer was then extruded under pressure (50 psi) through a valve on the bottom of the reactor into a water bath. Examples to make three arm star block copolymers are summarized in Table I.

TABLE I

| Three Arm Star Block Copolymers | | | | | | |
|---|---|---|---|---|---|---|
| Example | 1 | 2 | 3 | 4 | 5 | 6 |
| Caprolactam, g | 720 | 675 | 640 | 630 | 540 | 720 |
| Jeffamine T-3000, g | 80 | 225 | 160 | 270 | 360 | — |
| Batch 6833-2[1], g | | | | | | 180 |
| Deionized water, g | 300 | 200 | 200 | 300 | 150 | 300 |
| Differential Scanning Calorimetry | | | | | | |
| $T_m$, °C. | 216 | 214 | 217 | 214 | 213 | 216 |
| $T_c$, °C. | 181 | 171 | 171 | 159 | 155 | 171 |

[1]An analogue of Jeffamine T-3000 except that molecular weight is about 10,000 g/mol.

Figure 3:
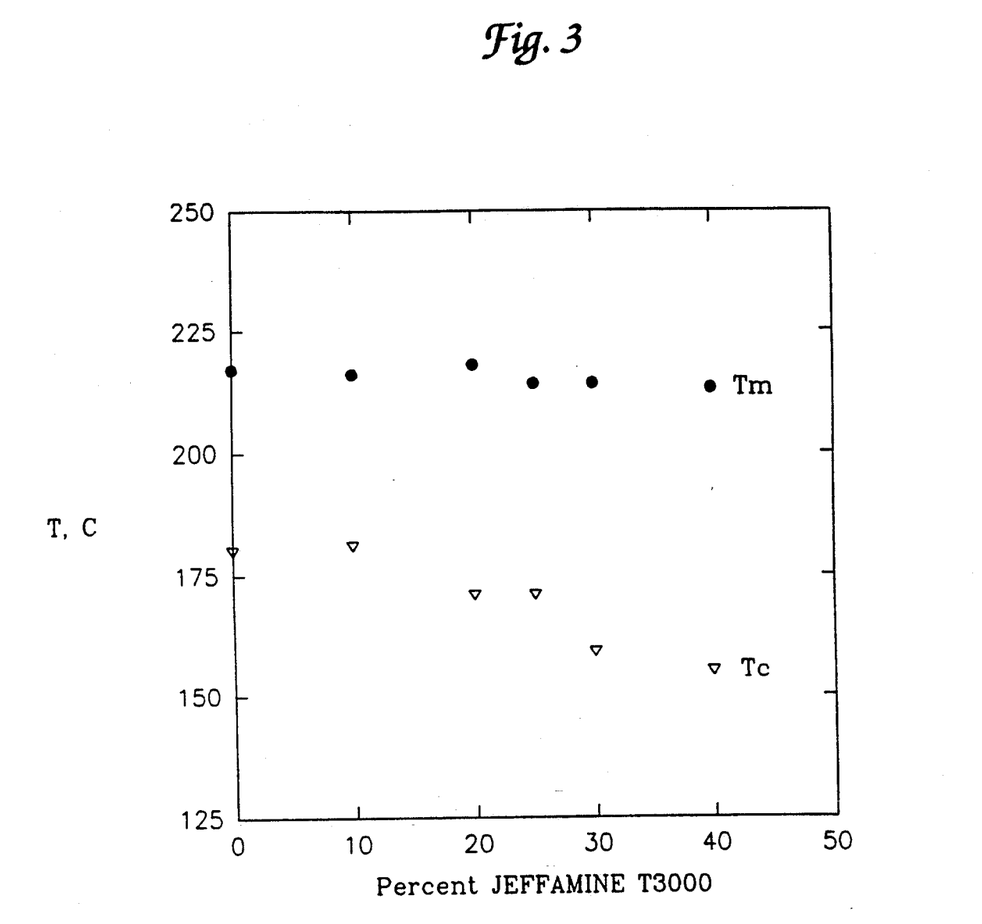
FIG. 3 is a plot of $T_m$ and $T_c$ v. percent of Jeffamine T3000 incorporated in nylon 6 for star branched copolymers, demonstrating that with increasing amounts of polyether amine, the temperature of crystallization, $T_c$, of a segmented block copolymer decreases, whereas with increasing amounts of polyether amine the $T_m$ of the triblock copolymers of this invention remains relatively constant.

These crystalline melting point, $T_m$, and temperature of crystallization, $T_c$, values are plotted on FIG. 3. FIG. 3 clearly demonstrates that although the $T_c$ decreases with decreasing caprolactam proportion, that $T_m$ does not; this result is surprising and unexpected.

EXAMPLE 7

Figure 1:
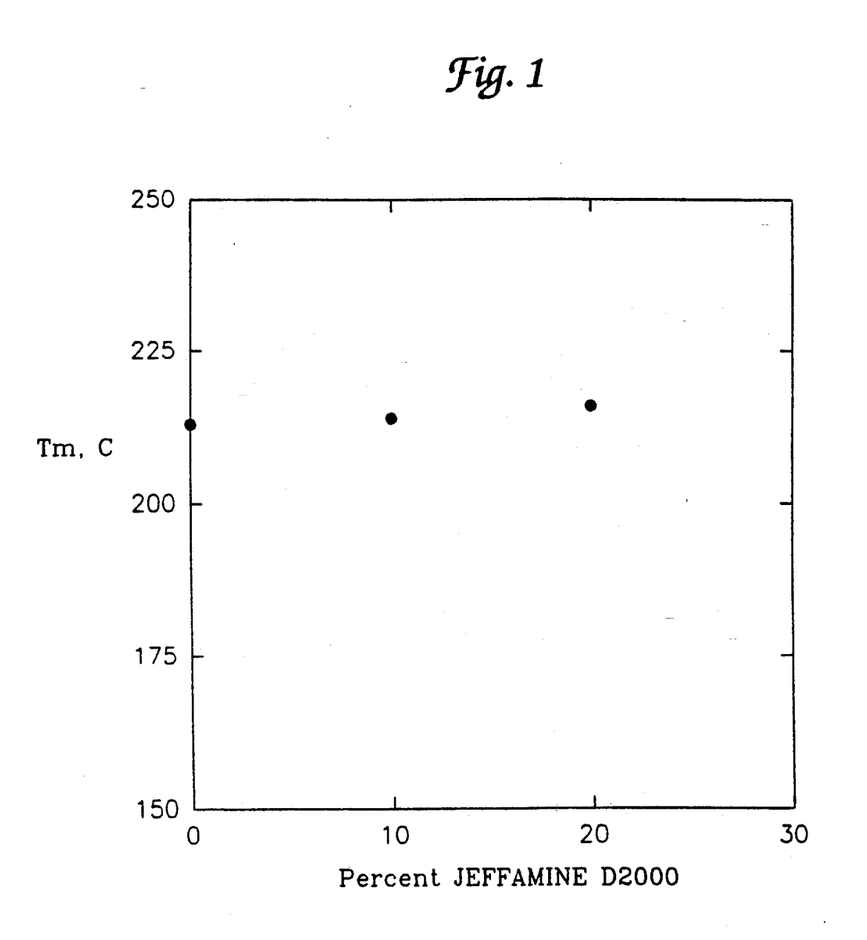
FIG. 1 is a plot of crystalline melting point, $T_m$, °C. v. percent of Jeffamine® D2000 diamine incorporated for linear block copolymers showing that the addition of considerable amounts of the Jeffamine D2000 does not lower the melting point.

Another example of a typical batch is Example 7: caprolactam 720 g, IRGANOX 1098 1.8 g, JEFFAMINE D2000 180 g, and 4 drops of hypophosphorous acid in 300 g of deionized water were added to a two liter, stirred, stainless steel batch reactor. The reactor was purged for 30 minutes with purified nitrogen, sealed and heated to 250° C. The reactor is held at 250° C. for 60 minutes. The pressure generated during the heating process was vented off. The reactor was held at 250° C. for two hours under a blanket of purified nitrogen. The polymer was then extruded under pressure (50 psi) through a valve on the bottom of the reactor into a water bath. Besides Example 7, other examples using a difunctional polyetherpolyamine are presented in Table IIA. Example 8 is a comparative Example using no diamine to give a homopolymer of nylon 6. It may be seen that the $T_m$ and $T_c$ values are quite comparable with the values of the linear block copolymers of this invention. These values are also plotted in FIG. 1. Table IIB reporting Examples 10-12 demonstrates similar linear block copolymers of this invention where the diamine had different ethylene oxide (EO) and propylene (PO) compositions.

TABLE IIA

| | Linear Block Copolymers | | |
|---|---|---|---|
| Example | 7 | 8 | 9 |
| Caprolactam, g | 720 | 1000 | 810 |
| Jeffamine D-2000, g | 180 | — | 90 |
| Deionized Water, g | 300 | 300 | 300 |
| Differential Scanning Calorimetry | | | |
| $T_m$, °C. | 216 | 213 | 214 |
| $T_c$, °C. | 169 | 173 | 175 |

TABLE IIB

| Linear Block Copolymers; 80% Nylon 6; 20% Random EO/PO Diamine | | | |
|---|---|---|---|
| Example | 10 | 11 | 12 |
| Original polyol composition % EO | 20 | 40 | 60 |
| % PO | 80 | 60 | 40 |
| Differential Scanning Calorimetry | | | |
| $T_m$, °C. | 215 | 215 | 216 |
| $T_c$, °C. | 180 | 180 | 180 |

EXAMPLE 13

Example 13 illustrates the use of a polyethertetramine to form a four arm star block copolymer according to the procedure of Example 1. The tetramine has the formula:

The preparation and results are summarized in Table III.

TABLE III

| Four Arm Star Block Copolymers | |
|---|---|
| Example | 13 |
| Caprolactam, g | 720 |
| 5800 g/mol MW polyether tetramine, g | 160 |
| Deionized water, g | 300 |
| Differential Scanning Calorimetry | |
| $T_m$, °C. | 214 |
| $T_c$, °C. | 175 |

All of the copolymers containing 25% or less polyether amine used in the above Tables produced tough, ductile, elastomeric polymers. Those containing more than 25%, generally appear to lack significant cohesive strength, immediately out of the reactor but before molding.

Upon the incorporation of increasing quantities of polyether amines, the crystalline melting point of the resulting copolymer did not decrease. Typically, segmented block copolymers produce copolymers in which increasing amounts of polyether amine, reduces the crystalline melting point of the copolymer. Since the triblock copolymers retain a higher crystalline melting point, they should have a higher use temperature than a segmented block copolymer. This effect shows the inherent advantage of polyamidopolyfunctional amine block copolymers over polyetheramide segmented block copolymers especially in engineering, high performance applications.

A variety of polyether polyamide block copolymers can also be prepared by the condensation of JEFFAMINE® polyethyleneglycol diamines (ET3000, ED 4000, ED-2001, EDR-148, etc.) with caprolactam in various compositions. The triethylene glycol diamine and tetraethylene glycol diamine products are known under the trade names JEFFAMINE® EDR-148 Amine and JEFFAMINE® EDR-192 Amine, respectively, as made by Texaco Chemical Co. Reactions are carried in various compositions. Reactions are carried out at 250° C. under nitrogen with water in a two liter stainless steel autoclave.

Specifically, reactants and water are charged then purged for 30 minutes followed by heating at 250° C. for two hours to allow ring-opening of the caprolactam with water. After the water is slowly vented off, reactants are held at this temperature for one additional hour to allow completion of the reaction. All extruded products are white and semitough having a range of initial viscosities. Water extractions are performed on all products to remove unreacted starting material in addition to high vacuum dryings. Copolymer structures are confirmed spectroscopically. Table IV shows percent composition and the results of each reaction. In each run, three drops of hypophosphorous acid, 2.0 grams of IRGANOX 1098 and 300 g of deionized water were added.

TABLE IV

| | Polyamidopolyether Amines from Polyethyleneglycol Diamines | | | |
|---|---|---|---|---|
| Ex. | Capro-lactam (g) | Polyether Amine | grams | Product Appearance |
| 14 | 800 | ET-3000 | 200 | Pearly white |
| 15 | 650 | ET-3000 | 350 | White |
| 16 | 800 | ED-2001 | 200 | White |
| 17 | 800 | ED-4000 | 200 | White |
| 18 | 425 | ED-6000 | 75 | White |
| 19 | 850 | EDR-148 | 150 | White |
| 20 | 950 | EDR-148 | 50 | White |
| 21 | 850 | BASF Poly* | 150 | White |

*THF 1100 - A polyether diamine based on poly(tetrahydrofuran) of molecular weight 1100.

When low molecular weight diamines are used to any appreciable extent, such as EDR-148, low molecular weight products are obtained. The products are white solids at room temperature and titrations proved that they are diamines. Example 19, for example, had an acid content of less than 0.01 meq/g and an amine content of 1.5 meq/g.

Figure 2:
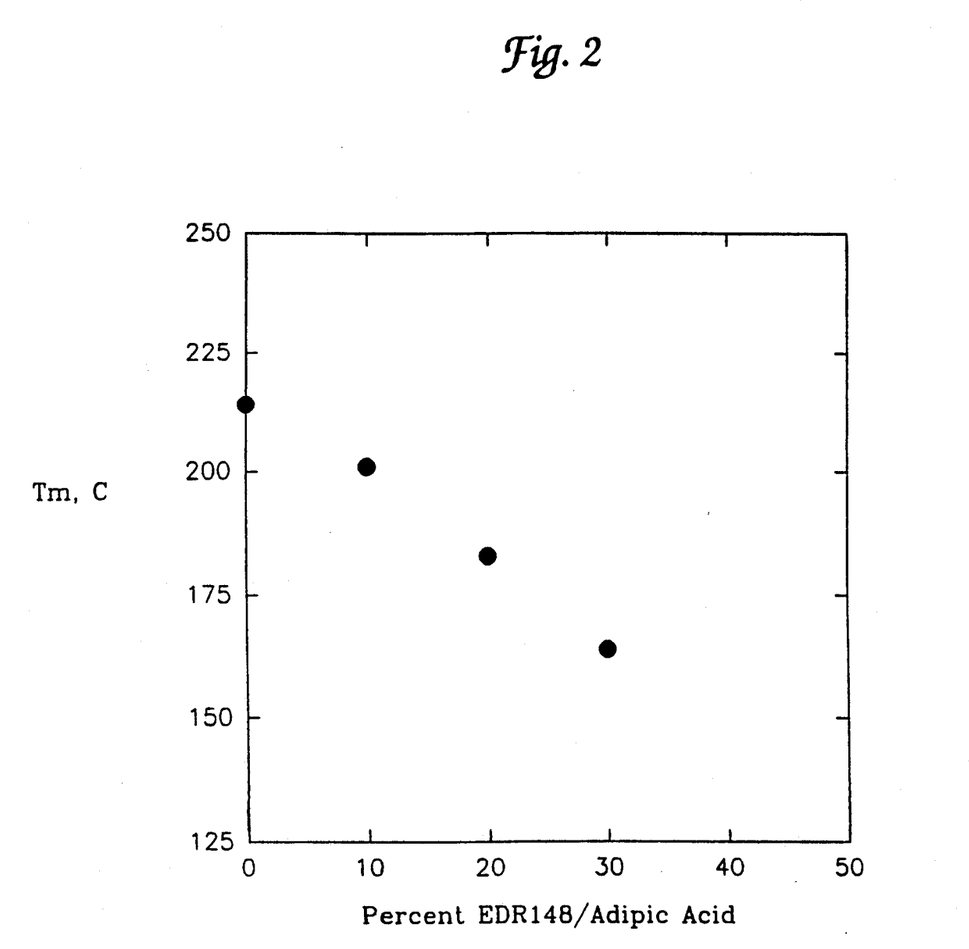
FIG. 2 is a plot of $T_m$ v. percent of Jeffamine EDR 148 and dibasic adipic acid incorporation in nylon 6 showing that when both the polyether and the dibasic acid are included in nylon 6 the melting point is reduced considerably.

As seen in FIG. 2, as the proportion of both EDR 148 and adipic acid together is increased when reacted with caprolactam, $T_m$ does decrease with increasing proportion. That is, if a polyether with a dibasic acid is added to nylon 6, the melting point is reduced considerably. This is because the symmetry of the crystalline region in nylon 6 is disturbed. The crystalline region remains intact in the composition of the invention where no dibasic acid is employed.

In Examples 22-24, summarized in Table V, reactants and water are charged, then purged for 15 minutes in a 300 milliliter stainless steel autoclave, followed by heating at 250° C. for two hours. After the water is slowly vented off, reactants are held at this temperature for one additional hour. In each run, 0.25 g of IRGANOX 1098 and 50 grams of deionized water were added.

TABLE V

| | Polyamidopolyether Amines | | | |
|---|---|---|---|---|
| Ex. | Lauro-lactam (g) | Polyether Amine | grams | Product Appearance |
| | | Triamine (star block) | | |
| 22 | 80 | ET-3000 | 20 | Off-white |
| 23 | 75 | T-3000 | 25 | Pale gray |
| | | Diamine (linear block) | | |
| 24 | 85 | BASF Poly | 15 | White |

Example 25 reported in Table VI is an additional triamine (star block) Example. As in Table IV, similarly when low molecular weight triamines are used to any appreciable extent, low molecular weight products are obtained. The products were white solids at room temperature.

TABLE VI

| | Low Molecular Weight Amine Reactions | | | |
|---|---|---|---|---|
| Ex. | Capro-lactam (g) | Amine | grams | Water, g | Product Appearance |
| 25 | 450 | T-403 | 50 | 175 | White |

EXAMPLES 25

The following experiment describes the preparation of an octafunctional amine.

Preparation of Eight Mole Propylene Oxide Adduct of Sucrose

Five pounds sucrose were charged into a ten-gallon kettle which was then purged with prepurified nitrogen. The reactor was the heated to 70° F. and 82 g triethylamine was charged. Propylene oxide (PO, 20.3 lb) was then added at 110°–115° C. at 50 psig. Approximately 11.5 hours were required for the addition of the PO. The reaction mixture was then digested for three hours at 110°–115° C. and purged with nitrogen for 30 minutes. Properties of the finished product were as follows:

| Properties | |
|---|---|
| Total amine, meq/g | 0.025 |
| Hydroxyl no., mg KOH/g | 577 |
| Water, wt. % | 0.028 |

Preparation of 40-Mole PO Adduct of Sucrose

Fifteen pounds of the sucrose.8PO initiator and 302.4 grams of 45% aqueous potassium hydroxide were charged into a ten-gallon reactor which was then purged with a prepurified nitrogen. The reactor was then heated to 110°–115° C. and the initiator dried to a water content of less than 0.1% using both vacuum and nitrogen stripping. Propylene oxide (36.3 lb) was then added at 110°–115° C. at 50 psig over a three-hour period. The reaction mixture was then digested to an equilibrium pressure and purged with nitrogen for 30 minutes. The alkaline product was neutralized at 95° C. by stirring two hours with 1089 Magnesol 30/40 adsorbent which was added to an aqueous slurry. Di-t-butyl p-cresol (11.6 g) was then added to stabilize the polyol. The neutralized product was then vacuum stripped at 110° C. to a minimum pressure, nitrogen stripped, and filtered. Properties of the finished product were as follows:

| Properties | |
|---|---|
| Hydroxyl no., mg KOH/g | 166 |
| Water, wt. % | 0.09 |
| pH in 10:6 isopropanol-water | 7.2 |
| Unsaturation, meq/g | 0.017 |
| Color, Gardner | 6 |
| Sodium, ppm | 1.1 |
| Potassium, ppm | 5.6 |
| Viscosity, °F., cs | |
| 77 | 1496 |
| 100 | 574 |

This polyol was aminated by a procedure as described in U.S. Pat. No. 3,654,370, incorporated herein by reference. The resulting amine had the properties shown below.

| Primary amine, meq/g | 2.80 |
|---|---|
| Total amine, meq/g | 2.95 |
| Total acetylatables, meq/g | 2.99 |

To a two-liter autoclave was added 280 grams of caprolactam, 70 g of the octafunctional amine, 50 ml of water and two drops of hypophosphorous acid. The contents were heated for two hours at 260° C., the water was distilled off and the contents heated an additional hour at 260° C. to yield a yellow brittle product. This product, 150 g, was heated with caprolactam, 300 g, 50 ml of water and two additional drops of hypophosphorous acid at 250° C. for two hours. The steam was removed and the contents heated an additional hour at 250° C. and then extruded. A yellow, very tough polyamide was obtained. Three runs with laurolactam and the octafunctional amine in weight ratios of 85:15, 90:10 and 92:8 yielded brittle products which indicated the molecular weight was low. This suggest that the prepolymer technique described for the caprolactam may be the best method for very high functional amine adducts.

EXAMPLES 27–30

Preparation of AB Diblock Copolymers of Nylon 6-Jeffamine ® Monoamines

The incorporation of polyether monoamines into nylon 6 produces a nylon that can be used in the compatiblization of nylons with other polymers. These materials also have antistat applications. The preparation of copolymers is the same as in the preparation of the previous star-block nylon 6 materials. In each run, 3 drops of hypophosphorous acid and 1.5 g of Irganox 1098 were added.

TABLE VII

Preparation of Diblock Copolymers Using Monoamines

| Ex. | Caprolactam | Polyetheramine | Water, g | Product Appearance |
|---|---|---|---|---|
| 27 | 950 g | M-1000, 50 g | 300 | White |
| 28 | 900 g | M-600, 100 g | 300 | White |
| 29 | 900 g | M-2070, 100 g | 300 | White |
| 30 | 900 g | M-2005, 100 g | 300 | Off-white |

Many modifications may be made in the process of this invention without departing from the spirit and scope thereof which are defined only in the appended claims. For example, one skilled in the art may discover that a certain combination or proportion of cyclic lactam and polyether polyamine may give advantageous properties.

| GLOSSARY | |
|---|---|
| BASF Poly (THF 1100) | α,ω-Bis(3-aminopropyl)poly(THF)-1100<br>$NH_2-(CH_2)_3-O(CH_2CH_2CH_2CH_2O)_{13}-(CH_2)_3-NH_2$ |
| IRGANOX | Complex, high molecular weight stabilizer sold by Ciba-Geigy Corporation used as an anti-oxidant. |
| JEFFAMINE ® D-2000 amine | Diamine sold by Texaco Chemical Company of the following structure:<br> |
| JEFFAMINE ® ED-2001 amine | Polyalkylene glycol diamine having the formula:<br>Formula ED<br><br>where A = 21 and B = 0.75. |
| JEFFAMINE ® ED-4000 amine | Polyalkylene glycol diamine of Formula ED where A = 42 and B = 0.75. |
| JEFFAMINE ® ED-6000 amine | Polyalkylene glycol diamine of Formula ED where A = 63 and B = 0.75. |
| JEFFAMINE ® EDR-148 amine | Triethylene glycol diamine made by Texaco Chemical Company. |

-continued

GLOSSARY

| | |
|---|---|
| JEFFAMINE ® ET-3000 amine | Polyalkylene glycol triamine having the formula:<br>$$CH_2-O-(CH_2CH_2O)_x-CH_2-\underset{CH_3}{\overset{|}{CH}}-O-CH_2\underset{CH_3}{\overset{|}{CH}}-NH_2$$<br>$$CH-O-(CH_2CH_2O)_y-CH_2-\underset{CH_3}{\overset{|}{CH}}-O-CH_2\underset{CH_3}{\overset{|}{CH}}-NH_2$$<br>$$CH_2-O-(CH_2CH_2O)_z-CH_2-\underset{CH_3}{\overset{|}{CH}}-O-CH_2\underset{CH_3}{\overset{|}{CH}}-NH_2$$<br>where $x + y + z = 58.2$. |
| JEFFAMINE ® M-600 amine | $CH_3OCH_2CH_2O(CH_2\underset{CH_3}{\overset{|}{C}}HO)_{\sim 8}CH_2\underset{CH_3}{\overset{|}{C}}HNH_2$ |
| JEFFAMINE ® M-1000 amine | $CH_3O(CH_2CH_2O)_{18.6}(CH_2\underset{CH_3}{\overset{|}{C}}HO)_{1.6}CH_2\underset{CH_3}{\overset{|}{C}}HNH_2$ |
| JEFFAMINE ® M-2005 amine | $CH_3OCH_2CH_2O(CH_2\underset{R}{\overset{|}{C}}HO)_{34}CH_2\underset{CH_3}{\overset{|}{C}}HNH_2$<br>R = 5% H, 95% $CH_3$ |
| JEFFAMINE ® M-2070 amine | $CH_3OCH_2CH_2O(CH_2\underset{R}{\overset{|}{C}}HO)_{40}CH_2\underset{CH_3}{\overset{|}{C}}HNH_2$<br>R = 70% H, 30% $CH_3$ |
| JEFFAMINE ® T-3000 amine | Partially aminated polyol having 1.0 meq/g total acetylatables, a total amine content of 0.99 meq/g and a primary amine content of 0.093 meq/g having the formula:<br>$$CH_2-(O-CH_2\underset{CH_3}{\overset{|}{C}}H)_x-NH_2$$<br>$$CH-(O-CH_2\underset{CH_3}{\overset{|}{C}}H)_y-NH_2$$<br>$$CH_2-(O-CH_2\underset{CH_3}{\overset{|}{C}}H)_z-NH_2$$<br>where $x + y + z = 46.4$. |
| JEFFAMINE ® T-403 amine | An analogue of Jeffamine T-3000 amine with a molecular weight of about 400. |

We claim:

1. An amidoamine of the formula:

where
- R is independently hydrogen or lower alkyl of 1 to 4 carbon atoms;
- R' is an alkyl group when k is 1, and is an alkylene group when k is greater than 1; where R' has 2 to 18 carbon atoms;
- R" is independently lower alkylene of 2 to 4 carbon atoms;
- R''' is independently straight or branched lower alkylene of 2 to 6 carbon atoms;
- x is independently 1 to 200;
- y is independently 1 to 300;
- z is independently 1 to 200;
- p is independently 2 to 11; and
- k is from 1 to 8; where the x and z groups are distributed in blocks or randomly.

2. The amidoamine of claim 1 where k is 1 and R' is an alkyl group.

3. The amidoamine of claim 1 where k is 2 and R' is an alkylene group.

4. The amidoamine of claim 1 where k is at least 3 and R' is an alkylene group.

5. An amidoamine of the formula:

where
- R is independently hydrogen or lower alkyl of 1 to 4 carbon atoms;
- R' is an alkyl group when k is 1, and is an alkylene group when k is greater than 1; where R' has 2 to 18 carbon atoms;
- R" is independently lower alkylene of 2 to 4 carbon atoms;
- x is independently 1 to 200;
- y is independently 1 to 300;
- p is independently 2 to 11; and
- k is from 1 to 8.

6. The amidoamine of claim 5 where k is 1 and R' is an alkyl group.

7. The amidoamine of claim 5 where k is 2 and R' is an alkyl group.

8. The amidoamine of claim 5 where k is at least 3 and R' is an alkyl group.

9. An amidomonoamine of the formula:

where

R is independently hydrogen or lower alkyl of 1 to 4 carbon atoms;
R' is an alkyl group of 2 to 18 carbon atoms;
R'' is independently lower alkylene of 2 to 4 carbon atoms;
x is independently 1 to 200;
y is independently 1 to 150; and
p is independently 5 to 11.

10. The amidoamine of claim 9 where
R' is an alkyl group of 2 to 10 carbon atoms;
x is independently 1 to 120; and
y is independently 1 to 125.

11. A polyamidodiamine of the formula:

where

R is independently hydrogen or lower alkyl of 1 to 4 carbon atoms;
R' is an alkyl group of 2 to 18 carbon atoms;
R'' is independently lower alkylene of 2 to 4 carbon atoms;
x is independently 1 to 200;
y is independently 1 to 150; and
p is independently 5 to 11.

12. The polyamidodiamine of claim 11 where
R' is an alkyl group of 2 to 10 carbon atoms;
x is independently 1 to 120; and
y is independently 1 to 125.

13. Polyamidotriamine of the formula:

where

R is independently hydrogen or lower alkyl of 1 to 4 carbon atoms;
R' is an alkyl group of 2 to 18 carbon atoms;
R'' is independently lower alkylene of 2 to 4 carbon atoms;
x is independently 1 to 200;
y is independently 1 to 150;
p is independently 5 to 11; and
k is from 1 to 6.

14. The polyamidotriamine of claim 13 where
R' is an alkyl group of 2 to 10 carbon atoms;
x is independently 1 to 120;
y is independently 1 to 125; and
k is from 1 to 4.

* * * * *